US011353782B2

(12) United States Patent
Södergård et al.

(10) Patent No.: US 11,353,782 B2
(45) Date of Patent: Jun. 7, 2022

(54) MOUNTING BRACKET

(71) Applicant: Axis AB, Lund (SE)

(72) Inventors: Åke Södergård, Lund (SE); Magnus Ainetoft, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/177,435

(22) Filed: Feb. 17, 2021

(65) Prior Publication Data
US 2021/0278753 A1 Sep. 9, 2021

(30) Foreign Application Priority Data

Mar. 6, 2020 (EP) .................................... 20161547

(51) Int. Cl.
*G08B 13/196* (2006.01)
*G03B 17/56* (2021.01)
*F16M 13/02* (2006.01)

(52) U.S. Cl.
CPC ........... *G03B 17/561* (2013.01); *F16M 13/02* (2013.01); *F16M 13/027* (2013.01); *G08B 13/19632* (2013.01)

(58) Field of Classification Search
CPC ................ F16M 13/027; G03B 17/561; G08B 13/19632
See application file for complete search history.

(56) References Cited

U.S. PATENT DOCUMENTS

| 7,217,045 | B2 * | 5/2007 | Jones ................. G08B 13/1963 348/E5.026 |
| 8,469,612 | B2 * | 6/2013 | Mukai .................. H04N 5/2254 348/374 |
| 9,823,551 | B2 * | 11/2017 | Adervall .............. F16M 11/041 |
| 10,386,704 | B2 * | 8/2019 | Wengreen ............ F16M 11/041 |
| 10,623,615 | B2 * | 4/2020 | Vestergren .......... F16M 11/041 |
| 2007/0145230 | A1 * | 6/2007 | Van Den Bossche ....................... H05K 5/0204 361/679.57 |
| 2015/0281650 | A1 | 10/2015 | Mohan |

(Continued)

FOREIGN PATENT DOCUMENTS

| CN | 108361492 A | 8/2018 |
| CN | 108870042 A | 11/2018 |

(Continued)

OTHER PUBLICATIONS

Extended European Search Report dated Sep. 21, 2020 for European Patent Application No. 20161547.3.

(Continued)

*Primary Examiner* — Bradley Duckworth
(74) *Attorney, Agent, or Firm* — Volpe Koenig

(57) ABSTRACT

A mounting bracket for the mounting of an electronic device, such as a camera, on a support surface is provided. The mounting bracket comprises a mounting plate configured to attach the mounting bracket to the support surface, and a device attachment portion configured to receive the electronic device. The mounting plate comprises a recess which is formed at a peripheral edge portion of the mounting bracket. In a condition when the mounting bracket is attached to the support surface, the recess allows insertion of a user's finger in an interspace being formed between the mounting plate and the support surface.

7 Claims, 2 Drawing Sheets

(56) References Cited

U.S. PATENT DOCUMENTS

| | | | |
|---|---|---|---|
| 2021/0099619 A1* | 4/2021 | Hertzman | H04N 5/2258 |
| 2021/0284082 A1* | 9/2021 | Tokito | H04N 5/225 |
| 2022/0041118 A1* | 2/2022 | Lindsay-Neale | G03B 17/561 |

FOREIGN PATENT DOCUMENTS

| | | |
|---|---|---|
| CN | 110805812 A | 2/2020 |
| EP | 1408272 A1 | 4/2004 |
| EP | 2887328 A1 | 6/2015 |
| EP | 3514436 A1 | 7/2019 |
| JP | 10-106334 A | 4/1998 |
| KR | 20-0456634 Y1 | 11/2011 |
| KR | 20170003299 U | 9/2017 |

OTHER PUBLICATIONS

Korean Office Action dated Mar. 3, 2022 for Korean Patent Application No. 10-2021-0008798.

* cited by examiner

MOUNTING BRACKET

TECHNICAL FIELD

The present invention refers to a mounting bracket for the mounting of an electronic device, such as a camera, on a support surface.

TECHNICAL BACKGROUND

Surveillance cameras are in most cases mounted in an elevated position to allow a good overview of the area to be monitored. The mounting may by way of example be on a wall, on a roof, in a ceiling, or on a post. The mounting is typically made by attaching the camera to a mounting bracket which in turn is mounted on the intended support surface. While the mounting bracket typically is configured to be permanently mounted, the camera is in most cases removably attached to allow maintenance. The camera may by way of example be attached to the mounting bracket by locking arrangements of the snap-fit type or by a locking arrangement requiring a twisting movement or the fitting of screws. No matter the solution, a pushing action in the direction towards the mounting bracket is more or less inevitably required. Pushing does however cause problems when the supporting surface is unstable. One example of an unstable supporting surface is a ceiling panel, also known as a ceiling tile which is free hanging by being suspended in wires or freely resting on a grid of supporting profiles. A pushing action will easily cause the ceiling panel to swing and/or lift. This makes the installation cumbersome and especially when standing on a ladder. There is also a risk of dirty finger-marks on the ceiling panels which are difficult to remove.

There is hence a need for an improved mounting bracket which allows easy attachment of an electronic device.

SUMMARY

Providing a mounting bracket that allows facilitated attachment of an electronic device no matter if it is a stable or unstable support surface would be beneficial. Additionally, the mounting bracket should be useful no matter type of locking arrangement used to attach the electronic device.

A mounting bracket for the mounting of an electronic device, such as a camera, on a support surface, comprises a mounting plate configured to attach the mounting bracket to the support surface, and a device attachment portion configured to receive the electronic device, wherein the mounting plate comprises a recess being formed at a peripheral edge portion of the mounting bracket, whereby in a condition when the mounting bracket is attached to the support surface, the recess allows insertion of a user's finger in an interspace being formed between the mounting plate and the support surface, the device attachment portion is a snap-fit member, a threaded coupling, a bayonet coupling or a screw mounting, and wherein the recess is arranged adjacent said device attachment portion thereby allowing the electronic device to be mounted to the mounting bracket by a one-hand grip using the thumb and index finger engaging the recess and the electronic device respectively.

By this solution, the mounting of the electronic device to the device attachment portion of a mounting bracket, after mounting the latter to a support surface, will be substantially facilitated. This applies no matter type of locking means on the device attachment portion. The recess formed in the mounting bracket may be seen as an integrated grip portion.

The recess is applicable no matter type of locking means on the device attachment portion. In the event the locking means should be of the snap-fit type, the operator can insert one finger, such as the tip of the index finger, into the recess while pushing the electronic device into a locking engagement with the device attachment portion with another finger on the same hand, such as the thumb, or simply by using the other hand to apply a pressure. Alternatively, in the event the attachment should require use of any tooling, such as a screw driver, or a relative twisting movement, the operator is allowed, again by inserting a finger or a portion thereof into the recess, to pull the mounting bracket towards herself while mounting the required screws or while twisting the electronic device into a locking engagement. This is of special relevance in the event the support surface should be of the unstable type, such as a ceiling panel which is freely hanging by being suspended in wires or freely resting on a grid of supporting profiles, where any pushing action will cause the ceiling panel to swing and/or lift.

The recess need not be large enough to allow insertion of a full finger. It is enough that a portion of the finger, such as the fingertip, may be inserted.

The recess will be substantially invisible to people once the device has been mounted, since the recess is substantially hidden in the periphery of the installation. Further, by the recess forming an integrated grip portion, the risk of any dirty finger-marks in the ceiling or on the support surface is minimized.

The recess may be defined by a depression in the mounting plate extending in a direction facing away from the mounting plate. Thus, the depression may have an extension which is convex in view of the support surface.

The provision of a recess in a mounting bracket is a very simple measure requiring no substantial design feature in any tooling or moulds, no matter stamping, casting or injection moulding. Also, there is no significant addition of material required.

The recess need not be large enough to allow insertion of a full finger. It is enough that a portion of the finger, such as the fingertip, may be inserted.

The mounting bracket and/or the electronic device may along a peripheral edge portion thereof comprise a cable receiving through-going hole, and the recess may be separated from said through-going hole. By a separation, there is no risk of any cables interfering with the access to the recess.

The mounting bracket may comprise more than one recess and the number of recesses may correspond to the number of electronic devices to be supported by the mounting bracket. By way of example, in the event of the mounting bracket being oval or elongated and being configured to receive two cameras side by side, two recesses may be provided on opposite ends as seen along the long axis. The recesses may be arranged along the same side of the periphery in view of the long axis or be arranged on opposite sides of the long axis.

The support surface may be associated with a ceiling panel, the ceiling panel being of the free-hanging type or the type supported by a grid of profiles.

The recess may be integrally formed as a curved portion at the peripheral edge portion of the mounting bracket. The mounting bracket may be cast from metal or the bracket may be injection moulded from a plastic material. The plastic material may be reinforced with fibrous components.

The mounting bracket may be cast from metal and the device attachment portion may be injection moulded from a plastic material. This combination of different materials is of special interest in the event of the attachment devices being of the snap-fit type. In such case, the attachment devices and the mounting brackets may be formed as separate, interconnected units where the units may be made of different materials. The mounting bracket as such may be formed by a metal, whereas the attachment device may be formed by a plastic material. Thereby the attachment device may be provided with an inherent elasticity allowing a facilitated mounting and also dismounting of the electronic device.

Further objects and advantages will be obvious to a person skilled in the art reading the detailed description given below describing different embodiments.

BRIEF DESCRIPTION OF THE DRAWINGS

The embodiments will be described in detail with reference to the schematic drawings.

DETAILED DESCRIPTION

Before going into the details, it should be stressed that each electronic device has its own unique design and hence requirements regarding the design of a mounting bracket. There is accordingly no universal design of a mounting bracket in view of geometry, size, number and positions of holes and connectors. Thus, the description to follow should be understood as a description of the idea of providing a mounting bracket with a recess which makes it possible to apply a counterforce that allows an operator to apply the inevitable pushing action which is required to interconnect two items. The disclosed embodiment is accordingly one out of many possible designs and the skilled person realizes which adaptions must be made to fit a specific electronic device.

Now turning to FIG. 1, one embodiment of a mounting bracket 100 will be described in order to elucidate the underlying inventive concept.

Figure 1:
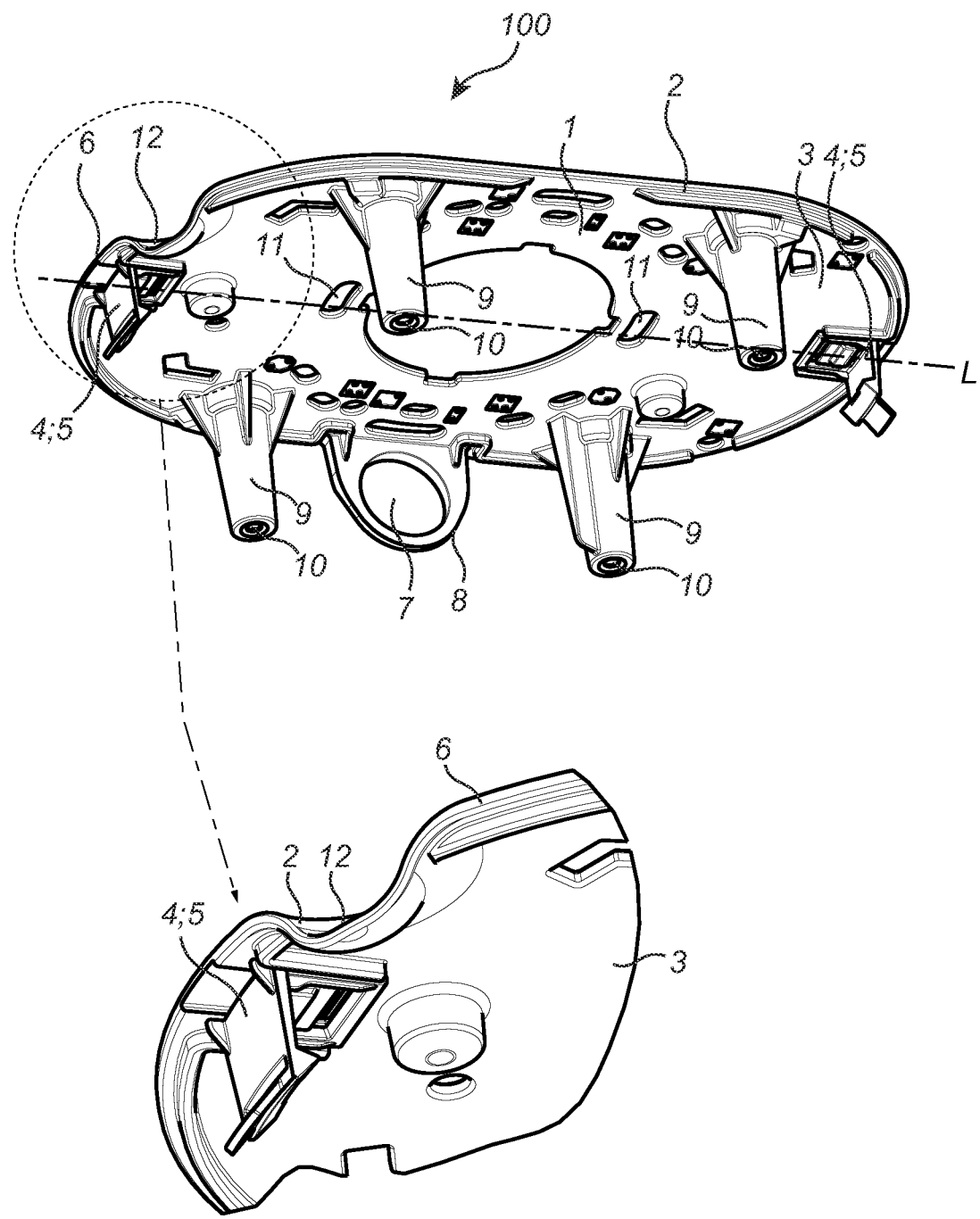
FIG. 1 discloses one embodiment of a mounting bracket.

The mounting bracket of FIG. 1 is disclosed as a unitary body comprising a mounting plate 1 having a rear surface 2 and an opposite front surface 3. The mounting bracket 100 may be cast from metal. Alternatively, the mounting bracket 100 may be injection moulded from a plastic material. The plastic material may be reinforced with one or more fibrous components.

Figure 2A:
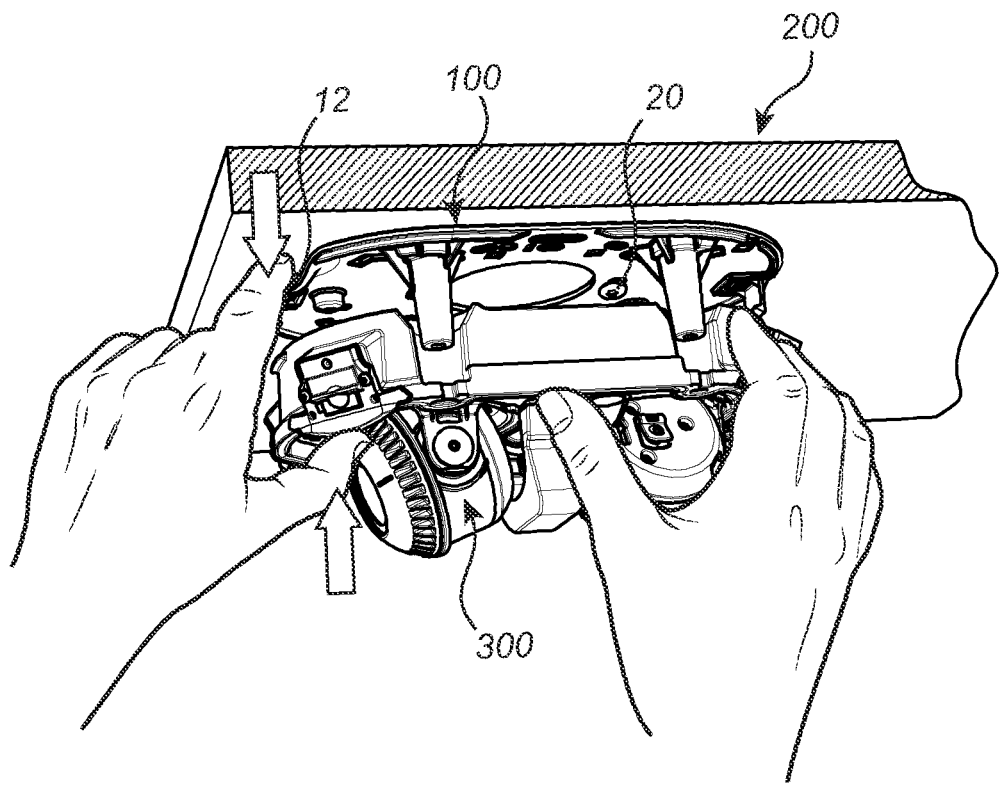
FIGS. 2A and 2B schematically disclose the act of mounting an electronic device in the form of a camera to the mounting bracket.
Figure 2B:
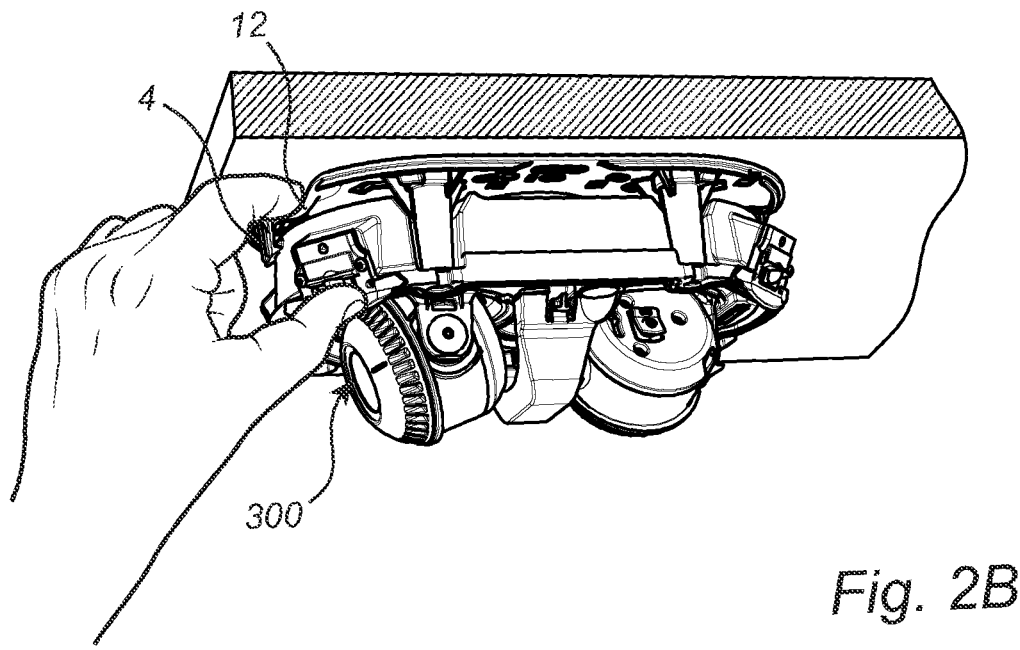

The mounting plate 1 is in use configured to be mounted to a support surface 200 by the rear surface 2 facing the support surface. The support surface 200 is illustrated in FIGS. 2A and 2B. The support surface 200 may by way of example be a wall, a ceiling or a ceiling panel. To allow a close abutment with the support surface 200 in the mounted condition, the rear surface 2 preferably has a generally flat extension.

The front surface 3 comprises two device attachment portions 4 configured to lockingly receive an electronic device 300, see FIG. 2A. In the disclosed embodiment, the device attachment portion 4 is embodied as two snap-fit members 5 which are arranged on opposing positions along a peripheral edge portion 6 of the mounting bracket 100. Thus, the disclosed mounting bracket 100 is configured to lockingly engage the electronic device 300 by a snap-fit engagement. The number of device attachment portions 3 and their positions may be adapted to the type and/or size of the electronic device 300. It also to be understood that other types of device attachment portions 4 may be used with maintained function. By way of example, the device attachment portion 4 may be a threaded coupling, a bayonet coupling or a screw mounting. Although the device attachment portions 4 are disclosed as being arranged along the peripheral edge portion 6, the device attachment portions 4 may be arranged inwardly displaced in view of the boundary formed by the peripheral edge portion 6.

The disclosed mounting bracket 100 further comprises a cable receiving through-going hole 7. The through-going hole 7 is preferably arranged along the peripheral edge portion 6. In the disclosed embodiment this is provided in the form of a loop-shaped extension 8 facing substantially perpendicularly away from the front surface 3 of the mounting bracket 100. The through-going hole 7 allows a non-disclosed cable to be guided therethrough. The cable may be used to power or communicate with the electronic device 300. The skilled person realizes that the position and the overall design of the through-going hole 7 preferably is adapted to the design of the electronic device 300 to be mounted to the mounting bracket 100.

The mounting bracket 100 comprises in the disclosed embodiment four connectors 9 in the form of screw towers. Each connector 9 comprises a through-going hole 10. The connectors 9 are configured to guide and partially receive non-disclosed mounting screws which are used to mount a non-disclosed protecting cover to the electronic device 300 when mounted to the mounting bracket 100. The number, positions and type of these connectors 9 may vary depending on the design of the electronic device 300.

Further, the mounting bracket 100 comprises a plurality of through-going openings 11 configured to allow mounting of the mounting bracket 100 to the support surface. The number, positions and type of these openings 11 may vary depending on the design of the mounting bracket 100. The mounting bracket 100 may preferably be provided with a surplus of through-going openings 11 to allow flexibility when mounting the mounting bracket 100 to the support surface. A soft support surface may by way of example require more connecting members than a hard support surface. The configuration of the openings may, for instance, be adapted to one or more standard gang boxes.

The mounting bracket 100 comprises a recess 12. The recess 12 is formed at the peripheral edge portion 6 of the mounting bracket 100. The recess 12 may be integrally formed as a curved portion at the peripheral edge portion 6. The recess 12 is in the disclosed embodiment defined by a depression 13 in the mounting plate 1, where the depression 13 extends in a direction facing away from the mounting plate 1. The depression 13 may have an extension which is convex in view of the support surface.

The recess 12 is preferably peripherally separated from the cable receiving through-going hole 7.

It is to be understood that the mounting bracket 100 may comprise more than one recess 12. The number of recesses 12 may correspond to the number of electronic devices 300 to be supported by the mounting bracket 100. By way of example, in the event of the mounting bracket 100 being oval or rectangular and is configured to receive two electronic devices side by side, two recesses 12 may be provided on opposite ends of the peripheral edge portion 6 as seen along a geometrical long axis L. The recesses 12 may be arranged along the same side of the peripheral edge portion 6 in view of the long axis L or be arranged on opposite sides of the long axis L.

A provision of two recesses 12 may facilitate the use of the mounting bracket 100 to both left-handed persons and right-handed persons.

Now turning to FIGS. 2A and 2B, the operation of the mounting bracket 100 will be discussed and especially the use of the recess 12.

As first act, the mounting bracket 100 is mounted to the intended support surface 200, such as a wall, a ceiling or a ceiling panel. In the disclosed embodiment the mounting bracket 100 is mounted by screws 20 (only is shown). In the event the support surface 200 is a ceiling panel, also knowns as a tile, the mounting bracket 100 may be mounted to the ceiling panel before mounting the ceiling panel to its final position in the ceiling.

As a following act, any cables are fitted to the mounting bracket 100. Cables are omitted in FIGS. 2A and 2B. If present, a cable may be inserted through the dedicated cable receiving through-going hole 7 disclosed in FIG. 1.

As a subsequent act, the electronic device 300 is mounted to the mounting bracket 100. No matter type of means for device attachment, some sort of pushing action is inevitably required when moving two items together. To facilitate this, the recess 12 which is formed in the mounting bracket 100 constitutes an integrated grip portion. During mounting of the electronic device 300, the operator can insert one finger, such as the tip of the index finger, into the recess 12 while pushing the electronic device 300 into a locking engagement with the device attachment portion 4 with another finger on the same hand, such as the thumb to apply a pressure. During this operation, the electronic device 300 may be held by the other hand. This operation is illustrated in FIGS. 2A and 2B.

Alternatively, in the event the attachment should require use of any tooling, such as a screw driver, or a relative twisting movement, the operator is allowed, again by inserting a finger in the recess 12, to pull the mounting bracket 100 towards herself while mounting the required screws or while twisting the electronic device 300 into a locking engagement with the mounting bracket 100. This is of special relevance in the event the support surface 200 should be of the unstable type, such as a ceiling panel which is freely hanging by being suspended in wires or freely resting on a grid of supporting profiles. In such unstable system, any pushing action will cause the ceiling panel to swing and/or lift. However, by using the mounting bracket 100 comprising a recess 12, the recess 12 will make it possible to apply a counterforce that allows the operator to apply the required pressure while still firmly holding the ceiling panel to prevent swinging and/or lifting.

The recess 12 will substantially be invisible to people when the device has been mounted since the recess is substantially hidden in the periphery of the installation. Further, since the recess 12 forms an integral grip portion, the risk of any dirty finger-marks on the support surface 200 is minimized.

Since the recess 12 and the cable receiving through-going hole 7 preferably are separated, i.e. mutually displaced along the peripheral edge portion 6, there is no risk of any cables interfering with the access to the recess 12.

As final act, after mounting the electronic device 300 to the mounting bracket 100, a non-disclosed protective housing may be mounted to the electronic device 300. In the disclosed embodiment, such mounting is intended to be made by inserting screws into the connectors 9. Additionally, in this operation, the recess 12 may be used for holding in the same way as has previously been discussed.

The recess 12 is applicable no matter type of locking means on the device attachment portion 4. In the event the locking means should be of the snap-fit type, it is preferred that the recess 12 is arranged adjacent the device attachment portion 4 thereby allowing the electronic device to be mounted to the mounting bracket by a one-hand grip using the thumb and index finger engaging the recess 12 and the electronic device 300 respectively as has been discussed above.

The support surface 200 may be associated with a ceiling panel. The ceiling panel may be of the free-hanging type or be of the type supported by a grid of profiles.

In the event the device attachment portion 4 is of the snap-fit type, the device attachment portion 4 and the mounting bracket 100 may be formed as interconnected units. The interconnected units may be made of different materials. The mounting bracket 100 as such may be formed by a metal, whereas the device attachment portion 4 may be formed by a plastic material. Thereby the device attachment portion 4 may be provided with an inherent elasticity allowing a facilitated mounting but also dismounting of the electronic device 300, while still benefitting from the rigidity provided by a mounting bracket 100 being formed by metal.

The description set forth herein relates to one specific design of a mounting bracket in order to describe the underlying concepts. As given above, each electronic device has its own unique design and requirements regarding the design of the mounting bracket. Thus, there is no universal design of the mounting bracket in view of geometry, size, number and positions of holes and connectors. Thus, the description above should be understood as a related to providing a mounting bracket with a recess which enables application of a counterforce that allows the operator to apply the inevitable pushing action which is required to interconnect two items, while mounting the electronic device to a mounting bracket.

The invention claimed is:

1. A mounting bracket for the mounting of a camera and other electronic devices, on a support surface, the mounting bracket comprising a mounting plate configured to attach the mounting bracket to the support surface, and a device attachment portion configured to receive an electronic device to be mounted, wherein:

the mounting plate comprises a recess being formed in a peripheral edge portion of the mounting bracket, said recess being formed as a depression in the mounting plate and having a convex extension away from the support surface, whereby in a condition when the mounting bracket is attached to the support surface, the recess allows insertion of a user's finger in an interspace being formed between the mounting plate and the support surface, the device attachment portion is a snap-fit member, a threaded coupling, a bayonet coupling or a screw mounting, and wherein, the recess is arranged adjacent said device attachment portion thereby allowing the electronic device to be mounted to the mounting bracket by a one-hand grip using the thumb and index finger engaging the recess and the electronic device respectively.

2. A mounting bracket according to claim 1, wherein the recess is defined by a depression in the mounting plate extending in a direction facing away from the mounting plate.

3. A mounting bracket according to claim 1, wherein the mounting bracket and/or the electronic device along the peripheral edge portion thereof comprises a cable receiving through-going hole, and wherein the recess is separated from said through-going hole.

4. A mounting bracket according to claim 1, wherein the mounting bracket comprises more than one recess and wherein the number of recesses corresponds to the number of electronic devices to be supported by the mounting bracket.

5. A mounting bracket according to claim 1, wherein the recess is integrally formed as a curved portion at the peripheral edge portion of the mounting bracket.

6. A mounting bracket according to claim 1, wherein the mounting bracket is cast from metal or wherein the mounting bracket is injection moulded from a plastic material.

7. A mounting bracket according to claim 1, wherein the mounting bracket is cast from metal and wherein the device attachment portion is injection moulded from a plastic material.

\* \* \* \* \*